US012044039B2

(12) United States Patent
Luo

(10) Patent No.: US 12,044,039 B2
(45) Date of Patent: Jul. 23, 2024

(54) OPENING AND CLOSING DEVICE

(71) Applicant: SINOX CO., LTD, New Taipei (TW)

(72) Inventor: Hong-Zhan Luo, New Taipei (TW)

(73) Assignee: SINOX CO., LTD, New Taipei (TW)

(*) Notice: Subject to any disclaimer, the term of this patent is extended or adjusted under 35 U.S.C. 154(b) by 449 days.

(21) Appl. No.: 17/463,977

(22) Filed: Sep. 1, 2021

(65) Prior Publication Data

US 2022/0064997 A1 Mar. 3, 2022

(30) Foreign Application Priority Data

Sep. 2, 2020 (TW) ................................ 109211511

(51) Int. Cl.

*E05B 37/02* (2006.01)
*E05B 63/00* (2006.01)
*G07C 9/00* (2020.01)

(52) U.S. Cl.

CPC .......... *E05B 63/0069* (2013.01); *E05B 37/02* (2013.01); *E05B 37/025* (2013.01); *G07C 9/00563* (2013.01)

(58) Field of Classification Search

CPC ............... E05B 37/0068; E05B 37/025; E05B 37/0031; E05B 2047/0056; E05B 2047/0084; E05B 2047/0086; E05B 2047/0012; E05B 67/22

See application file for complete search history.

(56) References Cited

U.S. PATENT DOCUMENTS 4,887,441 A * 12/1989 Ling ..................... E05B 37/025 70/25
6,761,051 B1 * 7/2004 Tsai .................... E05B 47/0012 70/279.1
7,948,359 B2 * 5/2011 Marcelle ............ G07C 9/00182 70/38 A (Continued)

FOREIGN PATENT DOCUMENTS

CN 104251080 A * 12/2014 ........... E05B 35/105
CN 108118979 A * 6/2018 ............. E05B 15/00
CN 207485147 U * 6/2018 ......... E05B 47/0012

(Continued)

OTHER PUBLICATIONS

United Kingdom Search Report for United Kingdom Application No. GB2112515.8, dated May 5, 2022.

*Primary Examiner* — Kristina R Fulton
*Assistant Examiner* — Noah Horowitz
(74) *Attorney, Agent, or Firm* — Birch, Stewart, Kolasch & Birch, LLP

(57) ABSTRACT

An opening and closing device is provided. The opening and closing device includes a housing, a displacement restricting part, an electrical driving module, and an electroless driving module. The displacement restricting part is capable of moving with respect to the housing when the electrical driving module is in an unlocked state. The electrical driving module is capable of restricting the displacement restricting part from moving with respect to the housing when the electrical driving module is in a locked state. The electroless driving module is capable of releasing the electrical driving module's restriction over the moving of the displacement restricting part with respect to the housing via the hand-driven part.

5 Claims, 9 Drawing Sheets

(56) References Cited

U.S. PATENT DOCUMENTS 8,640,513 B2 * 2/2014 Goren .................... E05B 67/10
70/284
9,556,651 B1 1/2017 Cabral Herrera

FOREIGN PATENT DOCUMENTS

CN 109763721 A * 5/2019
CN 109812153 A * 5/2019

* cited by examiner

OPENING AND CLOSING DEVICE

BACKGROUND

Field of the Invention

The present invention generally relates to an opening and closing device. More particularly, the present invention relates to an opening and closing device having an electronic driving module and an electroless driving module.

Related Art

In public places such as a market, campus, station, gym, etc., in order to display or deposit objects, a lock would be installed on a cabinet to prevent stealing or taking the object by mistake. Locks commonly used in above-mentioned public places include key locks and combination locks. These locks are not convenient to use since a user needs keys for key locks and has to memorize or record codes for combination locks. By comparison, a user can setup fingerprints for locking/unlocking fingerprint locks by himself and provide the fingerprint for sensing/identification when using the fingerprint lock without carrying any key or memorizing any codes.

However, fingerprint locks would not be unlocked if the electricity runs out or the sensing/identification of the fingerprint is not functioning. On the other hand, under special circumstances such as security inspection or management of cabinets in public places, special authority could not be provided for fingerprint locks. Therefore, conventional fingerprint locks are still improvable.

SUMMARY OF THE INVENTION

The object of the present invention is to provide an opening and closing device to resolve the issues of the prior arts.

The opening and closing device of the present invention includes a housing, a displacement restricting part, an electrical driving module, and an electroless driving module. At least a portion of the displacement restricting part is disposed in the housing and is capable of moving with respect to the housing. At least a portion of the electrical driving module is disposed in the housing. At least a portion of the electroless driving module is disposed in the housing, wherein the electroless driving module has a hand-driven part. The displacement restricting part is capable of moving with respect to the housing when the electrical driving module is in an unlocked state. The electrical driving module is capable of restricting the displacement restricting part from moving with respect to the housing when the electrical driving module is in a locked state. The electroless driving module is capable of releasing the electrical driving module's restriction over the moving of the displacement restricting part with respect to the housing via the hand-driven part.

In one embodiment, the housing includes a displacement restricting hole. The displacement restricting part includes a rod part and a hook part. The rod part is movably disposed in the housing. The rod part includes an engaging part. A free end is disposed on the other end of the hook part with respect to an end connecting to the rod part. The rod part is capable of moving to insert the free end into the displacement restricting hole. The electrical driving module includes an engaging piece disposed in the housing. When the displacement restricting part moves to a locked position and the electrical driving module is in a locked state, the engaging piece is capable of engaging with the engaging part to restrict the displacement restricting part from moving with respect to the housing.

In one embodiment, the electrical driving module further includes a fingerprint identification module and a first driving device disposed in the housing and coupled to each other. The fingerprint identification module is capable of sensing fingerprints to determine whether the electrical driving module is in an unlocked state or a locked state. The first driving device is capable of driving the engaging piece to engage with the engaging part when the displacement restricting part moves to the locked position and the electrical driving module is in a locked state. The first driving device is capable of driving the engaging piece to release the engagement with the engaging part when the electrical driving module is in an unlocked state.

In one embodiment, an engaging piece force receiving part is disposed at the bottom of the engaging piece. The first driving device includes a driving bump inserted into the engaging piece force receiving part. The first driving device is capable of rotating to make the driving bump drive the engaging piece to move.

In one embodiment, the displacement restricting part is capable of moving along the direction parallel to a Z-axis. The engaging piece is capable of moving along the direction parallel to an X-axis. The first driving device is capable of rotating to make the driving bump rotate along a plane parallel to an X-Y plan. The X-axis, a Y-axis, and the Z-axis are orthogonal.

In one embodiment, the engaging piece force receiving part is a groove extending along the direction parallel to the Y-axis.

In one embodiment, the electroless driving module is capable of releasing the engagement between the engaging piece and the engaging part when the electroless driving module is in an unlocked state.

In one embodiment, the electroless driving module further includes a first lock body and a second driving device. The first lock body is disposed in the housing and includes a lock shaft. At least a portion of the second driving device is disposed in the housing. The second driving device has a first end and a second end disposed on opposite ends. The first end is capable of abutting against one end of the lock shaft. The second end is capable of abutting against the engaging piece. The hand-driven part is disposed between the first end and the second end of the second driving device and extends outside the housing. The lock shaft restricts the second driving device from moving when the first lock body is in a locked state. When the first lock body is in an unlocked state, the lock shaft's restriction over the movement of the second driving device is released, wherein the second driving device is capable of moving to make the second end release the engagement between the engaging piece and the engaging part.

In one embodiment, the engaging piece has an engaging piece extending part. The engaging piece extending part is located on the path along which the second end moves toward the lock shaft when the engaging piece engages with the engaging part.

In one embodiment, the displacement restricting part is capable of moving along the direction parallel to a Z-axis. When the first lock body is in an unlocked state, the second driving device is capable of moving along the direction parallel to the Z-axis. The first end abuts against one end of the lock shaft to make the lock shaft move along the direction parallel to an X-axis. The second end abuts against the engaging piece extending part to make the engaging piece move along the direction parallel to the X-axis. The X-axis, a Y-axis, and the Z-axis are orthogonal.

DETAILED DESCRIPTION

Figure 1A:
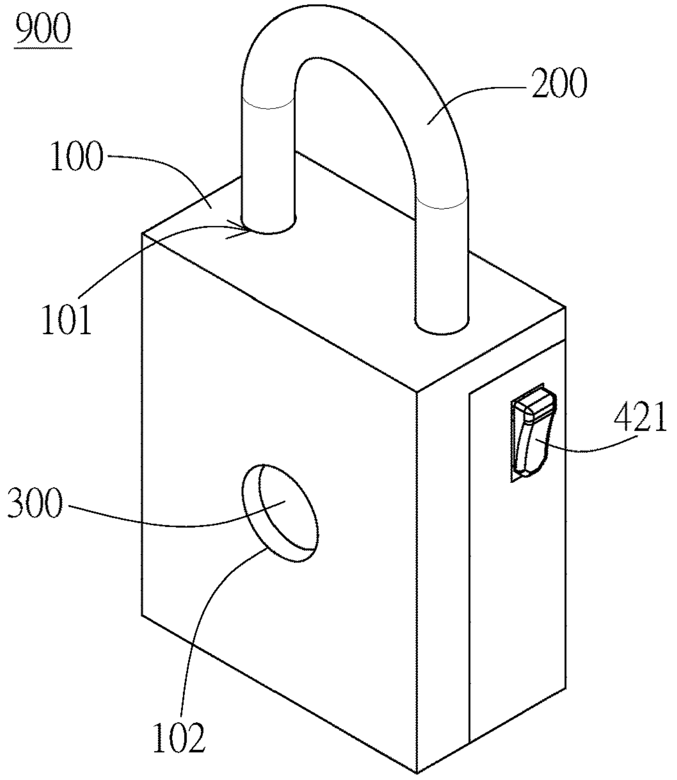
FIGS. 1A and 1B are perspective views of an embodiment of the opening and closing device of the present invention.
Figure 1B:
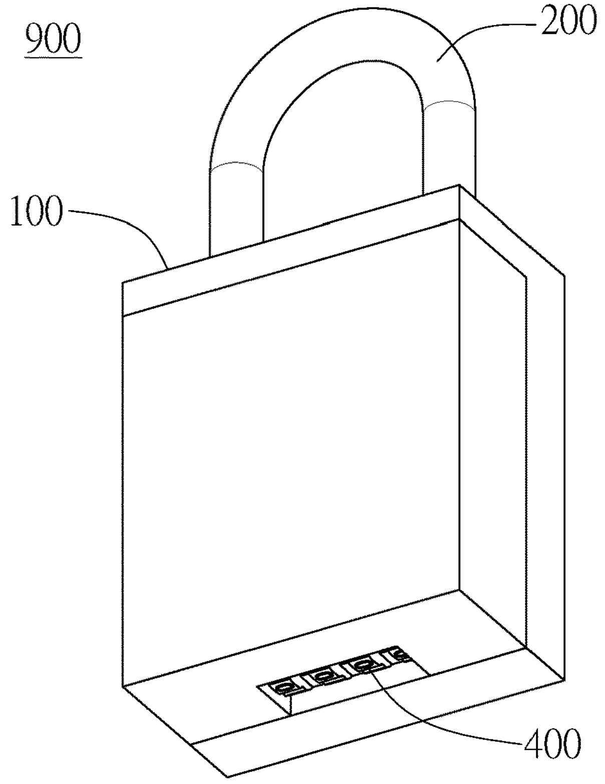

As shown in the embodiments in FIGS. 1A to 2B, the opening and closing device 900 of the present invention includes a housing 100, a displacement restricting part 200, an electrical driving module 300, and an electroless driving module 400. At least a portion of the displacement restricting part 200 is disposed in the housing 100 and is capable of moving with respect to the housing 100. At least a portion of the electrical driving module 300 is disposed in the housing 100. At least a portion of the electroless driving module 400 is disposed in the housing 100, wherein the electroless driving module 400 has a hand-driven part 421. The displacement restricting part 200 is capable of moving with respect to the housing 100 when the electrical driving module 300 is in an unlocked state. The electrical driving module 300 is capable of restricting the displacement restricting part 200 from moving with respect to the housing 100 when the electrical driving module 300 is in a locked state. The electroless driving module 400 is capable of releasing the restriction of the moving of the displacement restricting part 200 with respect to the housing 100 by the electrical driving module 300 via the hand-driven part 421.

Figure 2A:
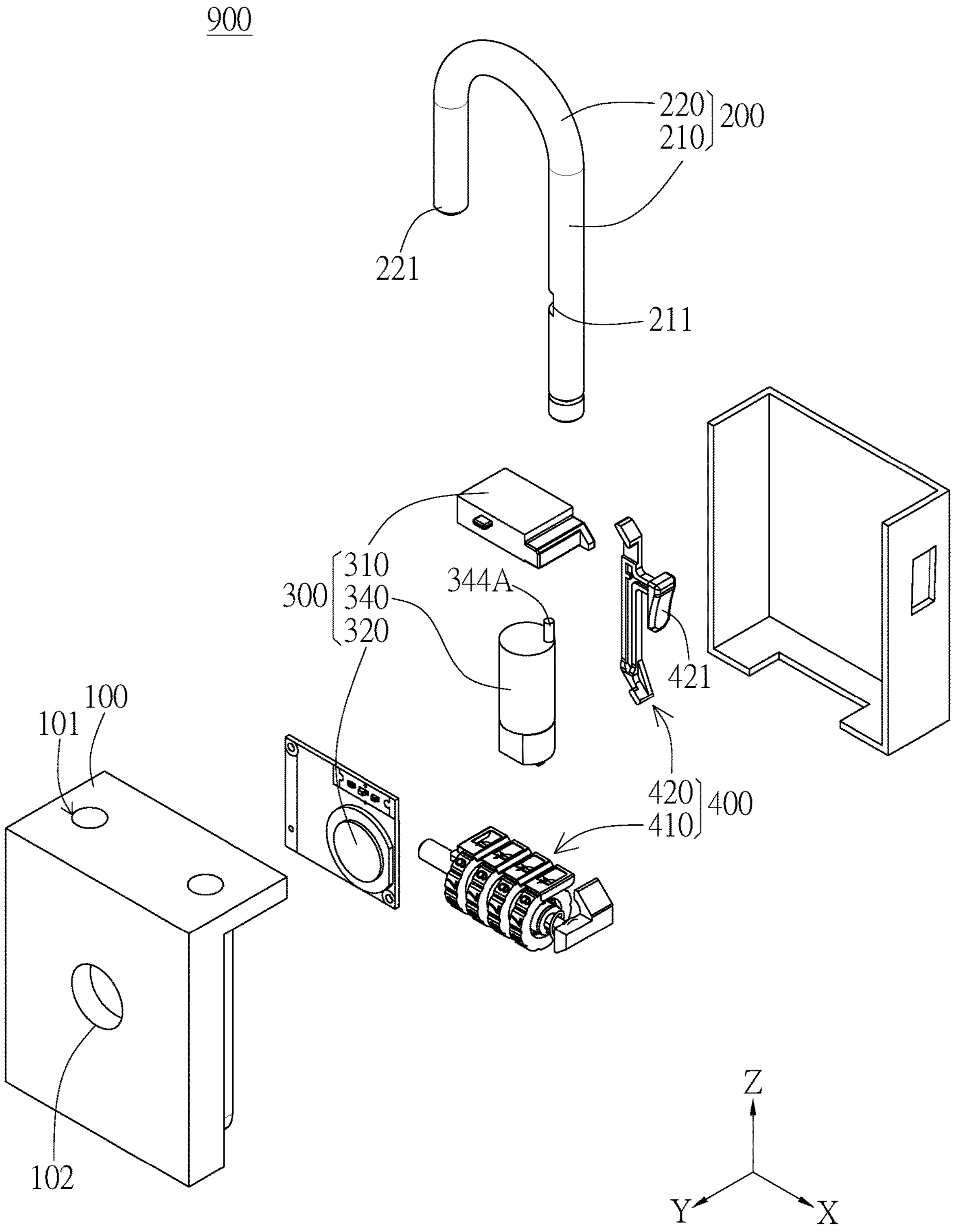
FIGS. 2A and 2B are exploded views of an embodiment of the opening and closing device of the present invention.
Figure 2B:
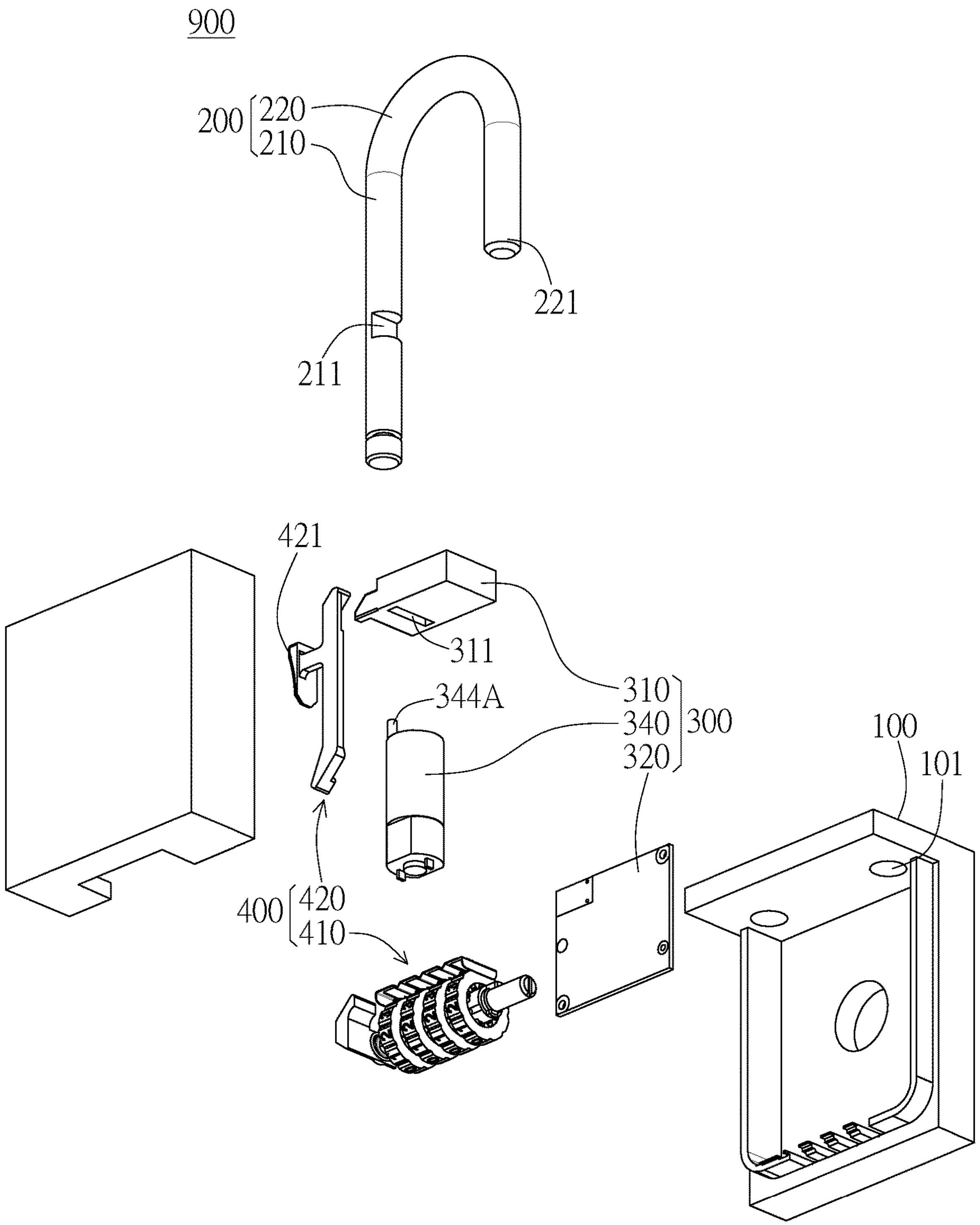

More particularly, as shown in the embodiments in FIGS. 2A and 2B, the housing 100 includes a displacement restricting hole 101. The displacement restricting part 200 is a hook piece including a rod part 210 and a hook part 220. The rod part 210 is movably disposed in the housing 100. The rod part 210 includes an engaging part 211. A free end 221 is disposed on the other end of the hook part 220 with respect to an end connecting to the rod part 210. The rod part 210 is capable of moving to insert the free end 221 into the displacement restricting hole 101. In different embodiments, however, the displacement restricting part 200 is not limited to a hook piece and may be designed in different manners according to manufacturing, design, or use requirements.

Figure 3A:
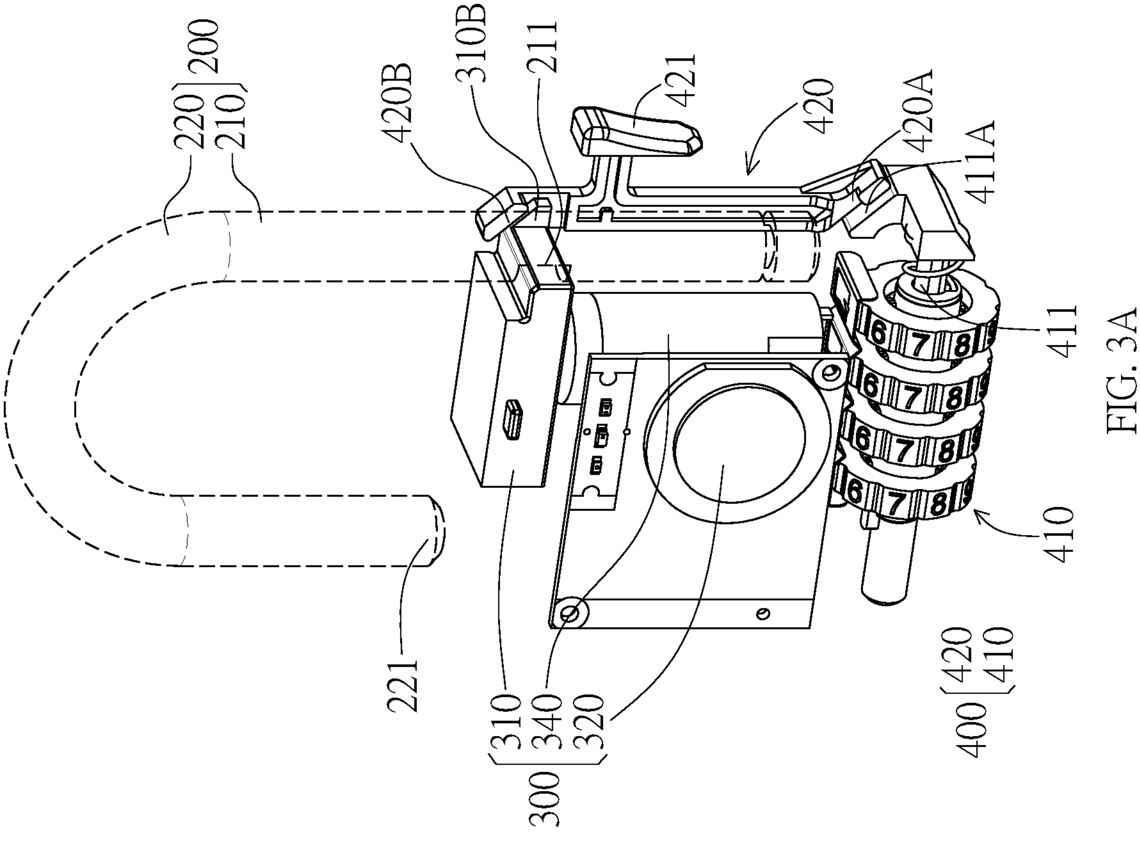
FIGS. 3A and 3B are perspective views of an embodiment of the opening and closing device of the present invention showing the electronic driving module in a locked state.
Figure 3B:
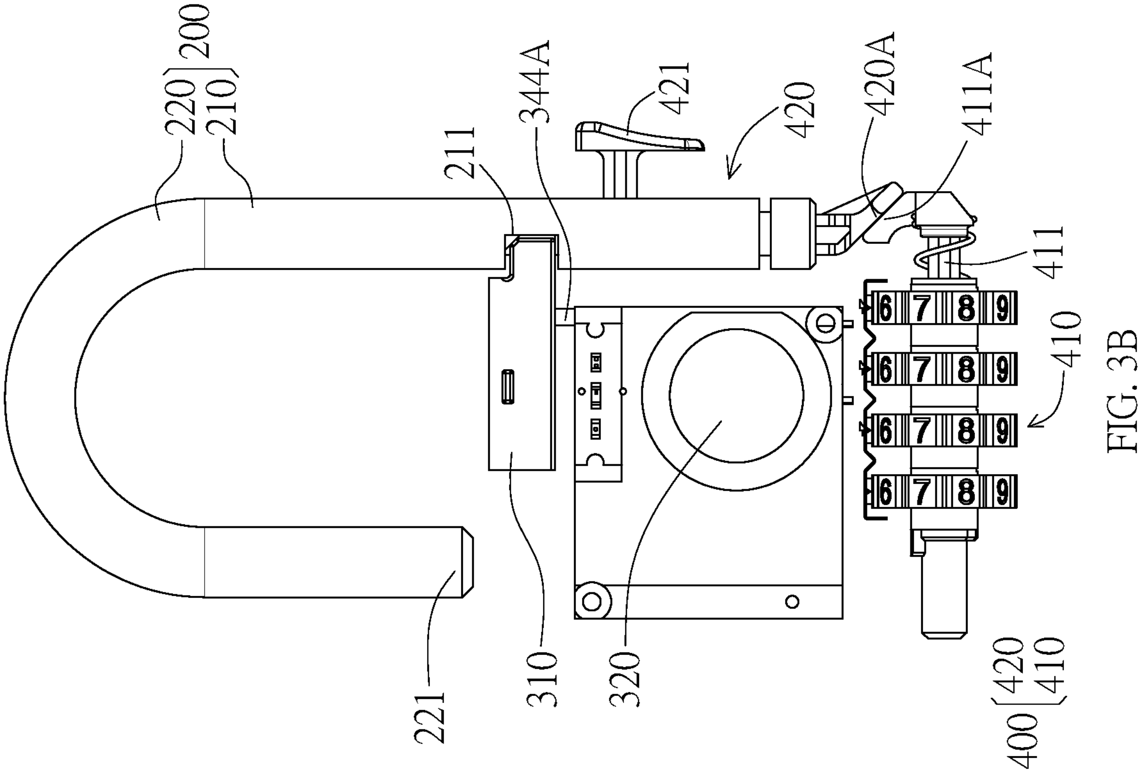
Figure 4A:
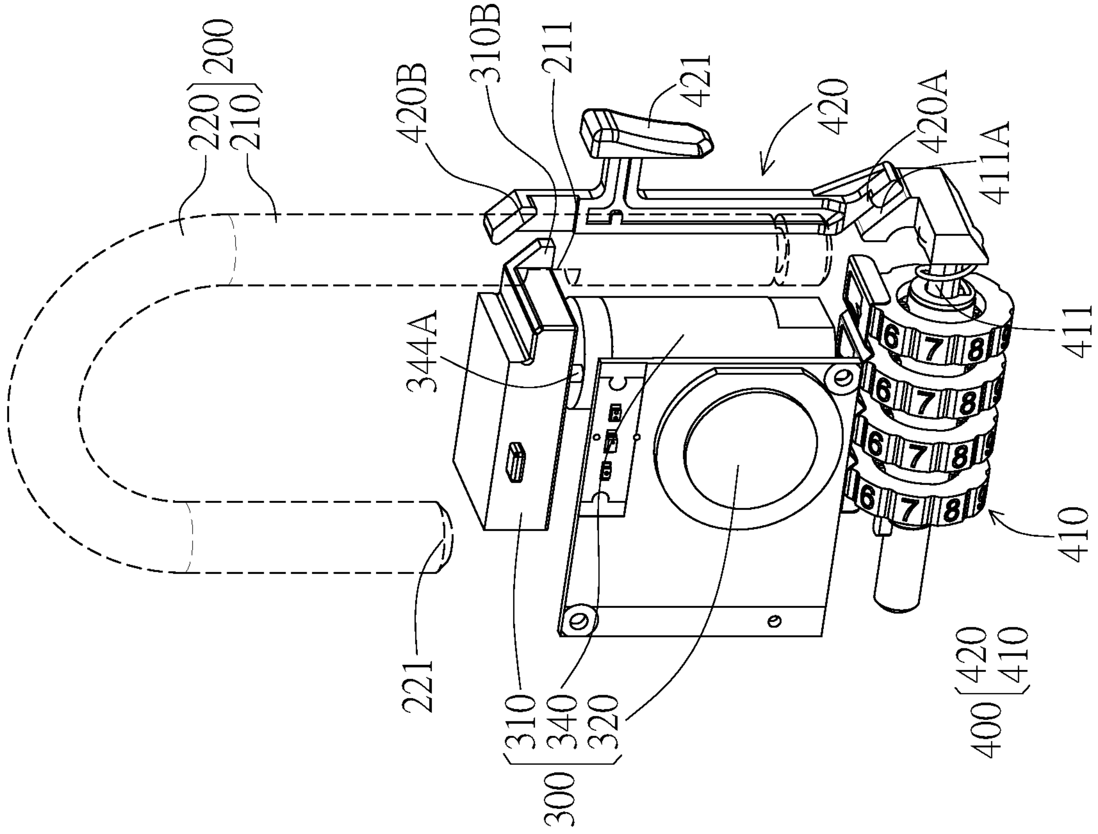
FIGS. 4A to 5B are perspective views of an embodiment of the opening and closing device of the present invention showing the electronic driving module in an unlocked state.
Figure 4B:
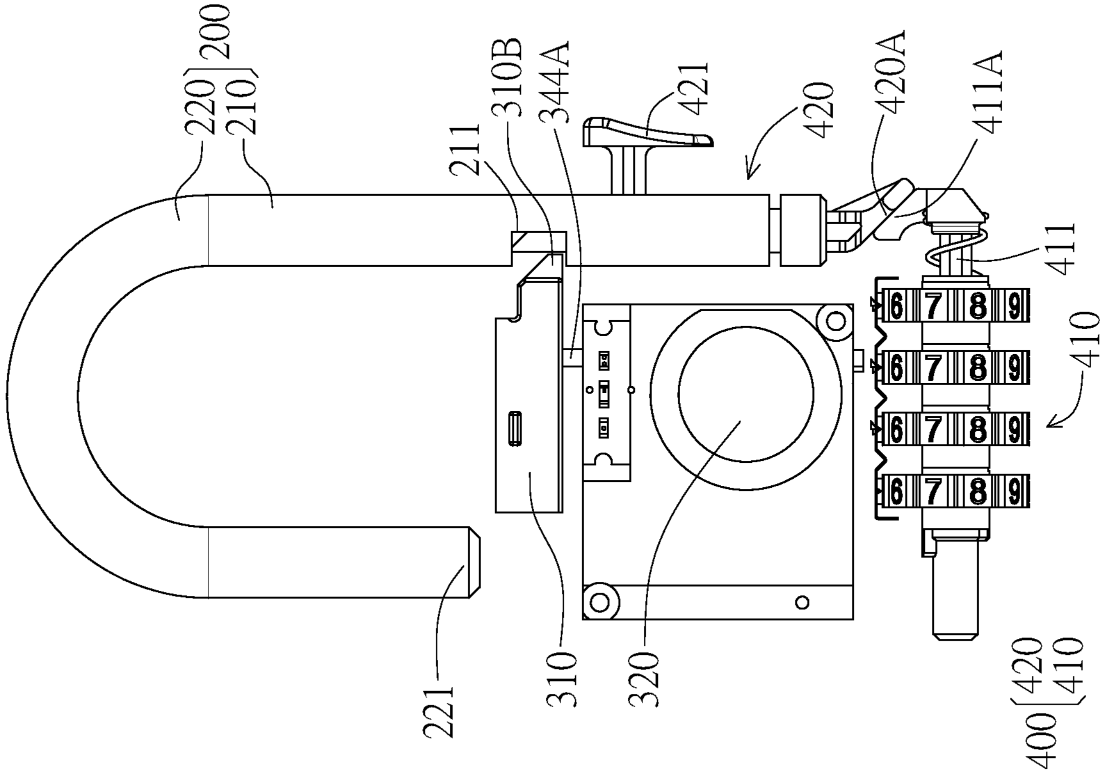
Figure 5B:
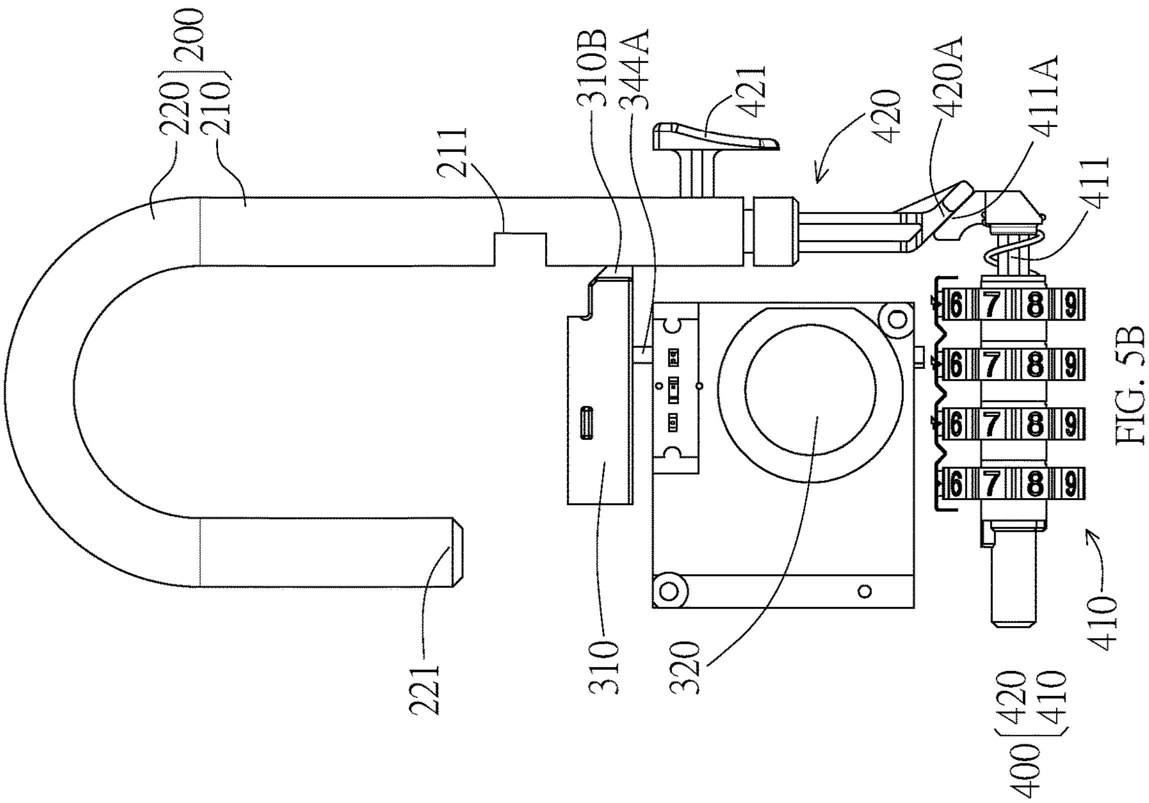
Figure 5A:
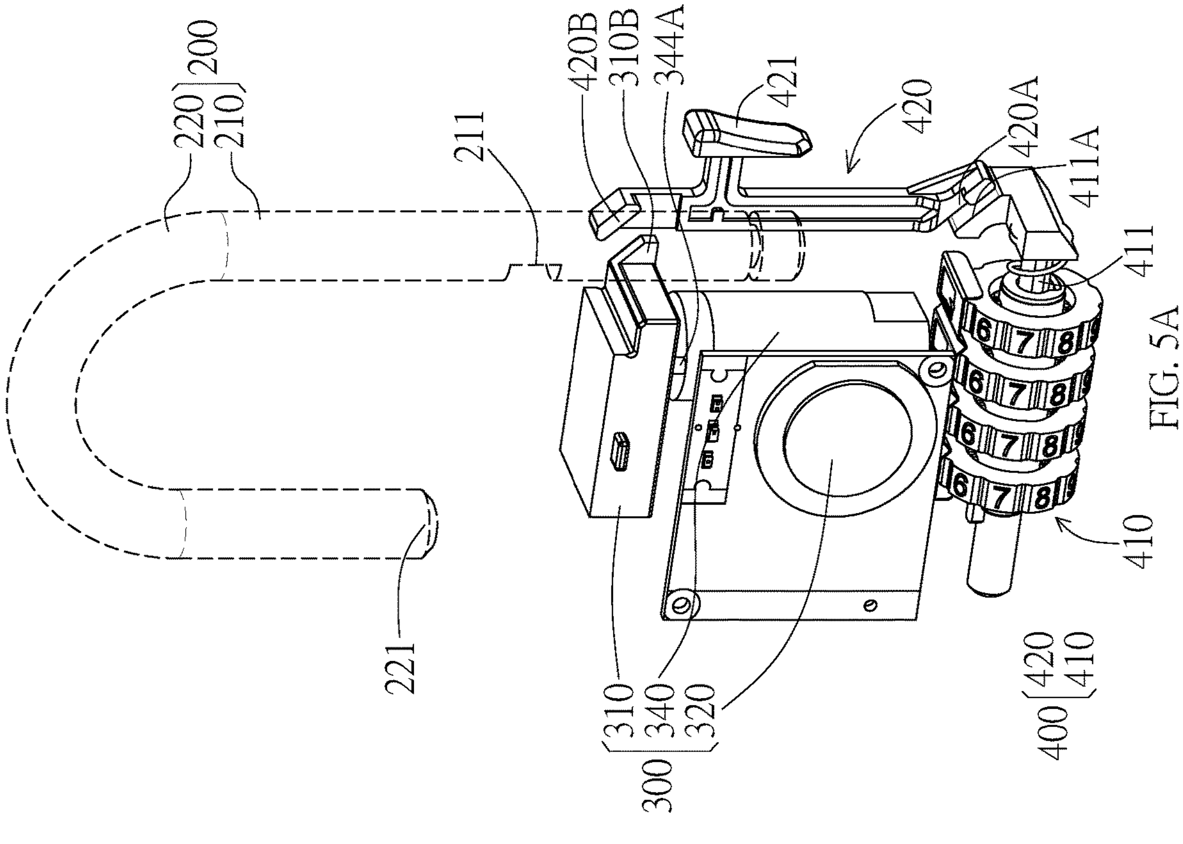

As shown in the embodiments in FIGS. 2A and 2B, the electrical driving module 300 includes an engaging piece 310 disposed in the housing 100. When the displacement restricting part 200 moves to a locked position (i.e. the free end 211 is inserted into the displacement restricting hole 101) and the electrical driving module 300 is in a locked state, the engaging piece 310 is capable of engaging with the engaging part 211 to restrict the displacement restricting part 200 from moving with respect to the housing 100. More particularly, the electrical driving module 300 further includes a fingerprint identification module 320 and a first driving device 340. The fingerprint identification module 320 can be exposed on the surface of the housing 100 via hole 102. The first driving device 340 is disposed in the housing 100 and is coupled to the fingerprint identification module 320. The fingerprint identification module 320 is capable of sensing fingerprints to determine whether the electrical driving module is in an unlocked state or locked state. No further discussion is made on the fingerprint identification module since it uses prior arts. As shown in the embodiments in FIGS. 3A and 3B, the first driving device 340 is capable of driving the engaging piece 310 to engage with the engaging part 211 when the displacement restricting part 200 moves to the locked position and the electrical driving module 300 is in a locked state. As shown in the embodiments in FIGS. 4A and 4B, the first driving device 340 is capable of driving the engaging piece 310 to release the engagement with the engaging part 211 when the electrical driving module 300 is in an unlocked state. At this time, as shown in the embodiments in FIGS. 5A and 5B, the rod part 210 is capable of moving to make the free end 211 leave the displacement restricting hole 101 (see FIG. 2A).

More particularly, as shown in the embodiments in FIGS. 2A and 2B, an engaging piece force receiving part 311 is disposed at the bottom of the engaging piece 310. The first driving device 340 includes a driving bump 344A. The driving bump 344A is disposed on the top of the first driving device 340 and can be inserted into the force receiving part 311 of the engaging piece 310. The first driving device 340 is capable of rotating to make the driving bump 344A drive the engaging piece 310 to move and hence to engage or disengage with the engaging part 211.

In the above mentioned embodiments, the displacement restricting part 200 is capable of moving along the direction parallel to a Z-axis. The engaging piece 310 is capable of moving along the direction parallel to an X-axis. The first driving device 340 is capable of rotating to make the driving bump 344A rotate along a plane parallel to an X-Y plan. The engaging piece's force receiving part 311 is a groove extending along the direction parallel to the Y-axis. The X-axis, a Y-axis, and the Z-axis are orthogonal. In different embodiments, however, the configuration and moving directions of the elements may be designed in different manners according to manufacturing, design, or use requirements.

The electroless driving module 400 is capable of releasing the engagement between the engaging piece 310 and the engaging part 211 when the electroless driving module 400 is in an unlocked state. More particularly, as shown in the embodiments in FIGS. 3A and 3B, the electroless driving module 400 further includes a first lock body 410 and a second driving device 420. The first lock body 410 is disposed in the housing 100 and includes a lock shaft 411. At least a portion of the second driving device 420 is disposed in the housing 100 (see FIG. 2A). The second driving device 420 has a first end 420A and a second end 420B disposed on opposite ends. The first end 420A is capable of abutting against the end 411A of the lock shaft 411. The second end 420B is capable of abutting against the engaging piece 310. When the first lock body 410 is in a locked state, the lock shaft 411 restricts the second driving device 420 from moving downward since the moving of the lock shaft 411 is restricted.

Figure 6B:
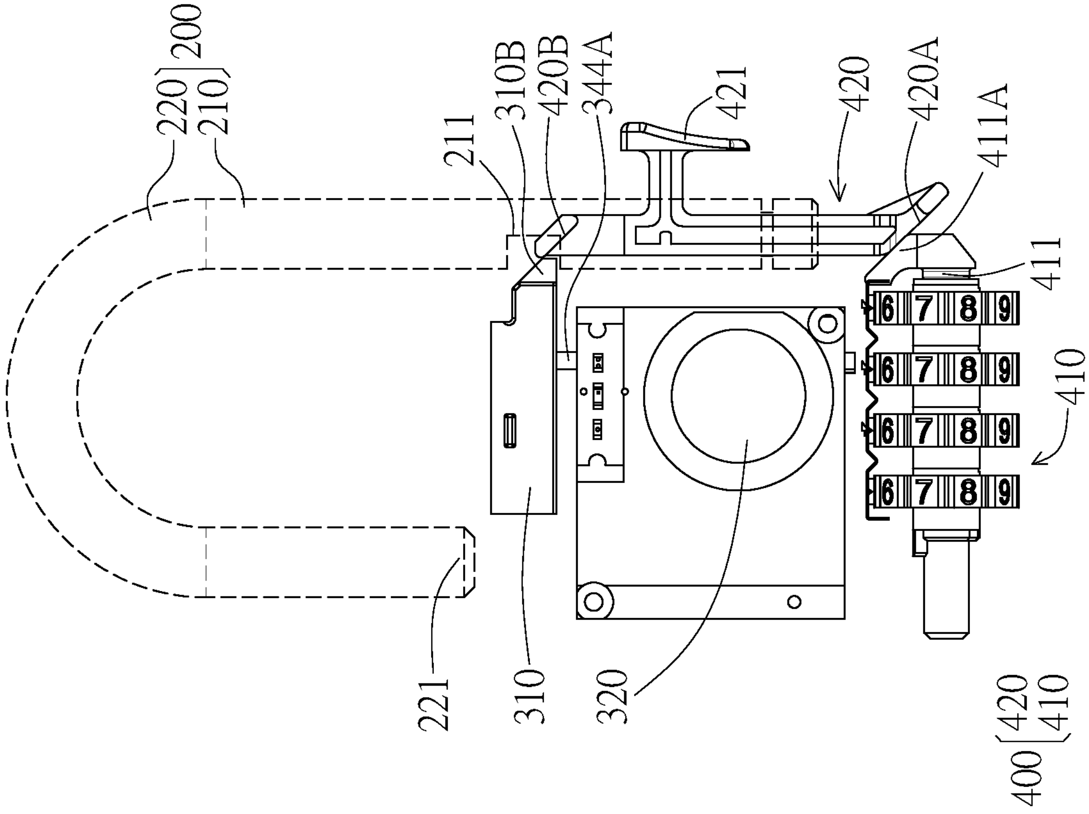
FIGS. 6A to 7B are perspective views of an embodiment of the opening and closing device of the present invention showing the second driving device moves to release the engagement between the engaging piece and the engaging part.
Figure 6A:
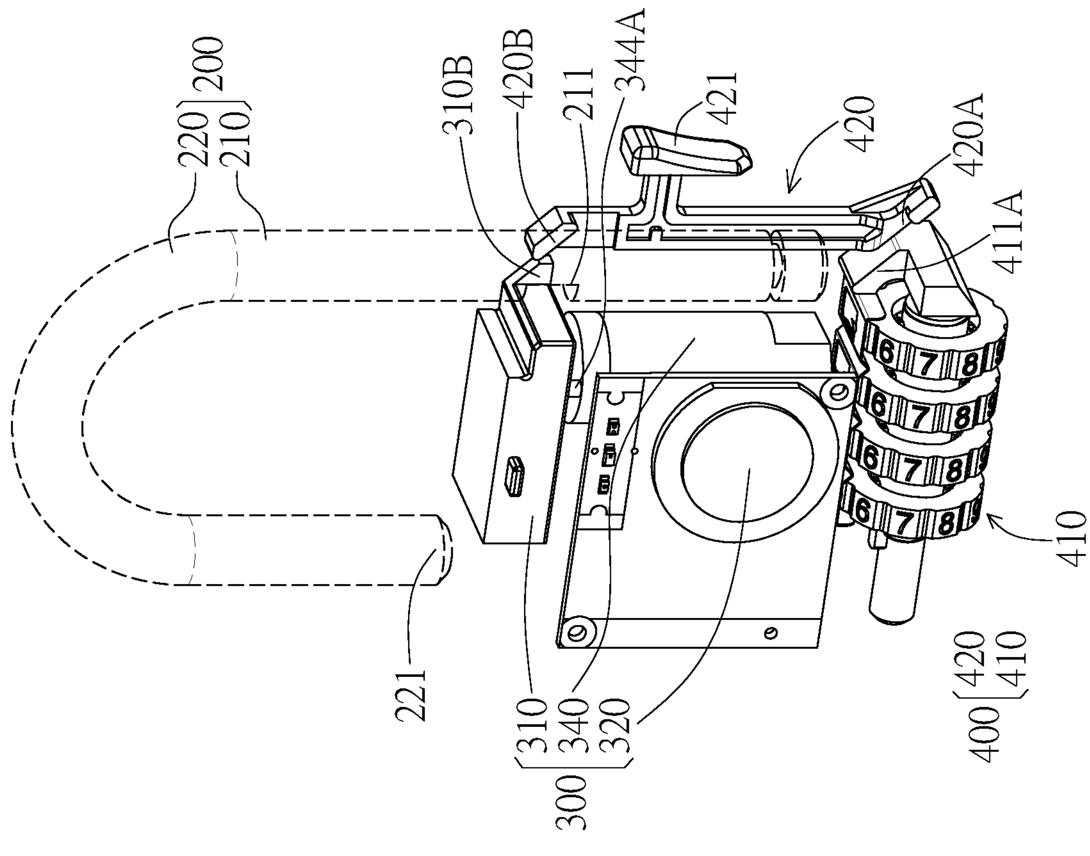

As shown in the embodiments in FIGS. 6A to 6B, when the first lock body 410 is in an unlocked state, the lock shaft

Figure 7B:
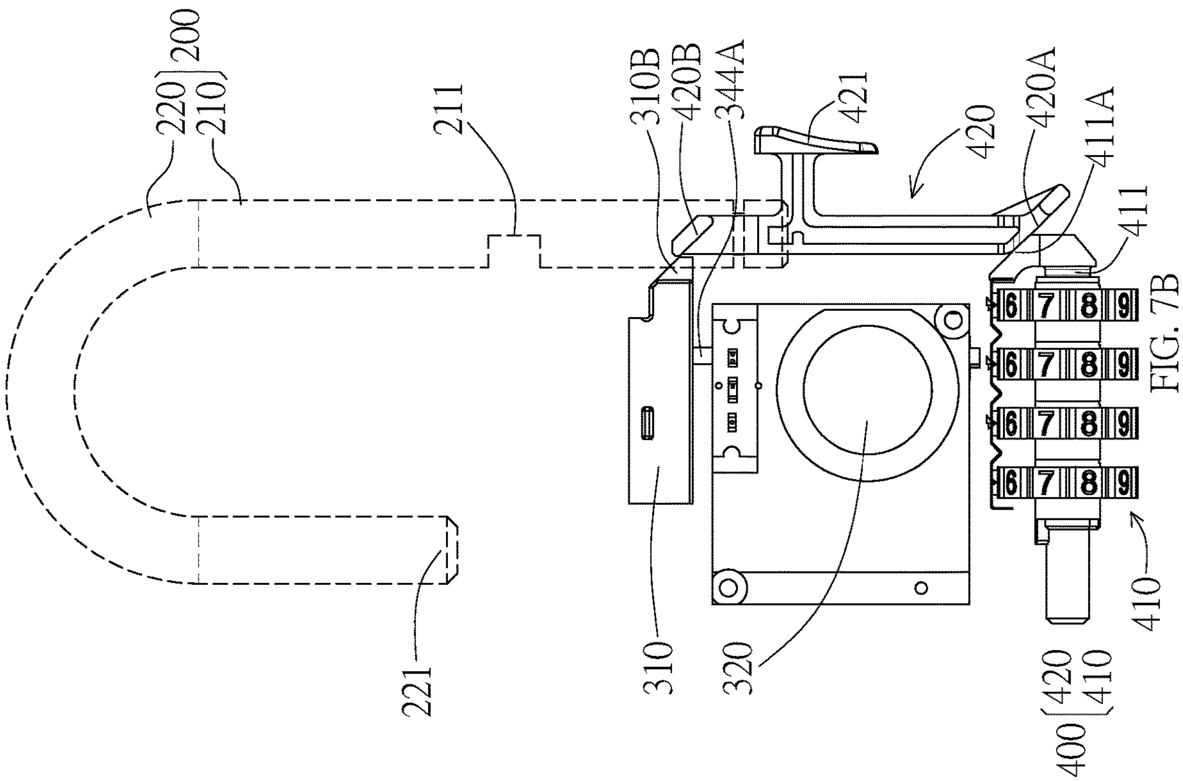
Figure 7A:
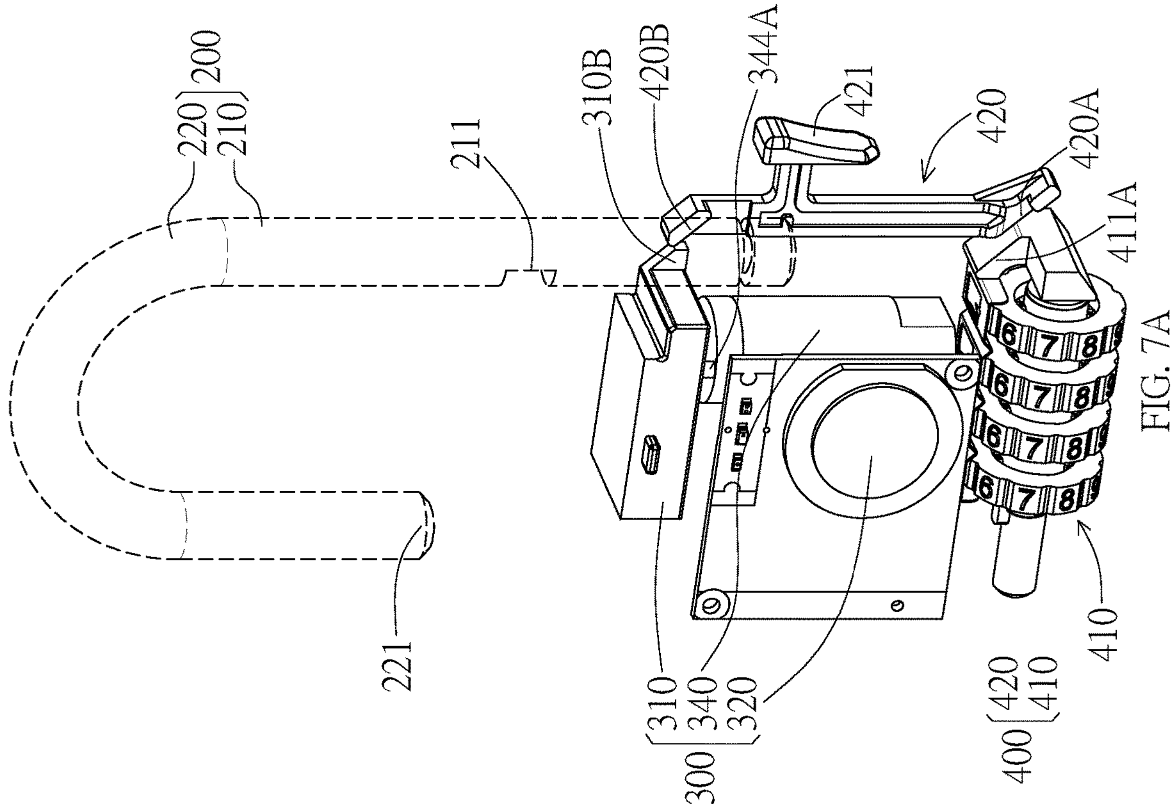

411 is capable of moving. Therefore, the restriction by the lock shaft 411 over the movement of the second driving device 420 is released, wherein the second driving device 420 is capable of moving downward to make the second end 420B release the engagement between the engaging piece 310 and the engaging part 211. More particularly, the engaging piece 310 has an engaging piece extending part 310B. The engaging piece extending part 310B is located on the path along which the second end 420B moves toward the lock shaft 411 when the engaging piece 310 engages with the engaging part 211. Therefore, when the first lock body 410 is in an unlocked state, the restriction by the lock shaft 411 over the movement of the second driving device 420 is released, and the second driving device 420 is capable of moving toward the lock shaft 411. Hence, the second end 420B can move toward the lock shaft 411, abut against the engaging piece extending part 310B, push the engaging piece 310 away from the rod part 210, and release the engagement between the engaging piece 310 and the engaging part 211. After then, as shown in the embodiments in FIGS. 7A to 7B, the displacement restricting part 200 is capable of moving to make the free end 211 leave the displacement restricting hole 101. In one embodiment, the hand-driven part 421 is disposed between the first end 420A and the second end 420B of the second driving device 420 and extends outside the housing 100. The hand-driven part 421 could be a block which allows a user to push the second driving device 420 toward the lock shaft 411.

In the above-mentioned embodiments, the displacement restricting part 200 is capable of moving along the direction parallel to a Z-axis. When the first lock body 410 is in an unlocked state, the second driving device 420 is capable of moving along the direction parallel to the Z-axis. The first end 420A abuts against the end 411A of the lock shaft 411 to make the lock shaft 411 move along the direction parallel to an X-axis. The second end 420B abuts against the engaging piece extending part 310B to make the engaging piece 310 move along the direction parallel to the X-axis. The X-axis, a Y-axis, and the Z-axis are orthogonal. In different embodiments, however, the configuration and moving directions of the elements may be designed in different manners according to manufacturing, design, or use requirements. On the other hand, the first lock body 410 is not limited to a combination lock and could be other locks such as a key lock.

Figure 8:
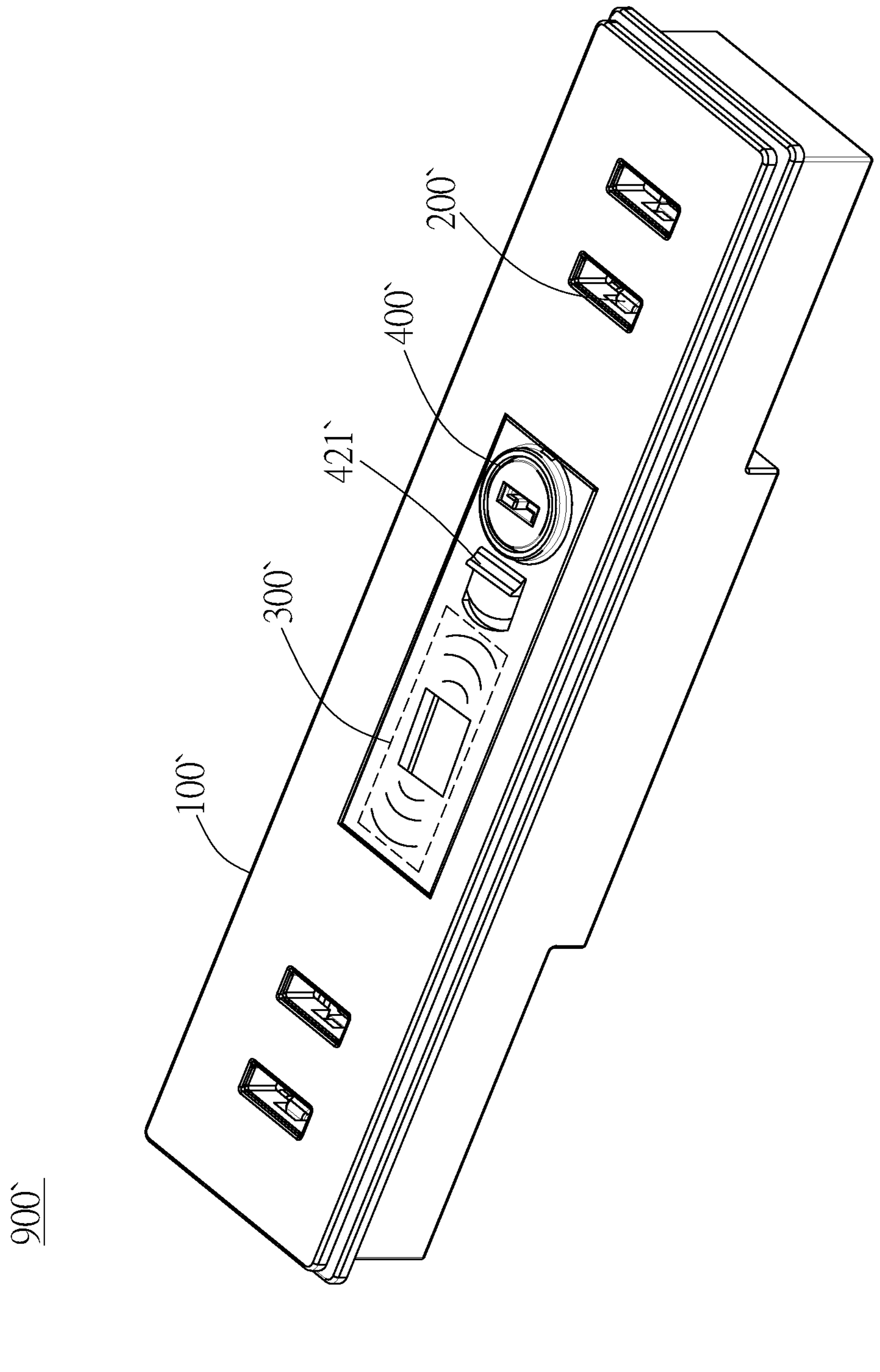
FIG. 8 is a perspective view of a different embodiment of the opening and closing device of the present invention.

In the above-mentioned embodiments, the opening and closing device is a padlock, wherein the displacement restricting part is a hook piece, the electronic driving module includes a fingerprint identification module, and the electroless driving module is a combination lock module. In different embodiments, however, the opening and closing device can be different locks and may be designed in different manners according to manufacturing, design, or use requirements. As shown in a different embodiment in FIG. 8, the opening and closing device 900' is a luggage case lock, wherein the displacement restricting part 200' is a hook member, the electronic driving module 300' includes a wireless signal induction lock, the electroless driving module 400' is a key lock module, and the hand-driven part 421 is a push piece. When the user makes the wireless signal induction lock be in an unlocked state through ways such as sensing a card, the hook member can move to release the zipper puller of the zipper of the luggage case. When the wireless signal induction lock is in a locked state, the wireless signal induction lock can restrict the hook member from moving and hence prevents the zipper puller from leaving the luggage case lock. When the user unlocks the key lock module by a key, the user can release the wireless signal induction lock's restriction over the movement of the hook member by pushing the push piece.

Accordingly, in the opening and closing device of the present invention, the restriction over the movement of the displacement restricting part can still be released by the electroless driving module when the electronic driving module is in a locked state. Therefore, situations such as the fingerprint locks not unlocking or the sensing/identification of the fingerprint not functioning when the electricity runs out could be avoided. For special circumstances such as security inspection and management of cabinets in public places, special authority such as special keys and codes could be provided to resolve the issues of the prior arts.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An opening and closing device, comprising:

a housing:

a displacement restricting part, wherein at least a portion of the displacement restricting part is disposed in the housing and is capable of moving with respect to the housing;

an electrical driving module, wherein at least a portion of the electrical driving module is disposed in the housing;

an electroless driving module, wherein at least a portion of the electroless driving module is disposed in the housing, wherein the electroless driving module has a hand-driven part;

wherein:

the displacement restricting part is capable of moving with respect to the housing when the electrical driving module is in an unlocked state;

the electrical driving module is capable of restricting the displacement restricting part from moving with respect to the housing when the electrical driving module is in a locked state;

the electroless driving module is capable of releasing the electrical driving module's restriction over the moving of the displacement restricting part with respect to the housing via the hand-driven part;

wherein:

the housing includes a displacement restricting hole;

the displacement restricting part includes:

a rod part movably disposed in the housing, wherein the rod part includes an engaging part;

a hook part, wherein a free end is disposed on the other end of the hook part with respect to an end connecting to the rod part, the rod part is capable of moving to insert the free end into the displacement restricting hole;

wherein the electrical driving module includes an engaging piece disposed in the housing, wherein the engaging piece is capable of engaging with the engaging part to restrict the displacement restricting part from moving with respect to the housing when the displacement restricting part moves to a locked position and the electrical driving module is in a locked state;

wherein the electroless driving module is capable of releasing the engagement between the engaging piece and the engaging part when the electroless driving module is in an unlocked state;

wherein the electroless driving module further includes:

a first lock body, wherein the first lock body is disposed in the housing and includes a lock shaft;

a second driving device at least partially disposed in the housing, wherein the second driving device has a first end and a second end disposed on opposite ends, wherein the first end is capable of abutting against one end of the lock shaft, wherein the second end is capable of abutting against the engaging piece, wherein the hand-driven part is disposed between the first end and the second end of the second driving device and extends outside the housing;

wherein the lock shaft restricts the second driving device from moving when the first lock body is in a locked state;

wherein when the first lock body is in an unlocked state, the lock shaft's restriction over the movement of the second driving device is released;

wherein the second driving device is capable of moving to make the second end release the engagement between the engaging piece and the engaging part;

wherein the engaging piece has an engaging piece extending part, wherein the engaging piece extending part is located on the path along which the second end moves toward the lock shaft when the engaging piece engages with the engaging part;

wherein the displacement restricting part is capable of moving along the direction parallel to a Z-axis, wherein when the first lock body is in an unlocked state, the second driving device is capable of moving along the direction parallel to the Z-axis, the first end abuts against one end of the lock shaft to make the lock shaft move along the direction parallel to an X-axis, the second end abuts against the engaging piece extending part to make the engaging piece move along the direction parallel to the X-axis, wherein the X-axis, a Y-axis, and the Z-axis are orthogonal.

2. The opening and closing device according to claim 1, wherein the electrical driving module further includes:

a fingerprint identification module disposed in the housing, wherein the fingerprint identification module is capable of sensing fingerprints to determine whether the electrical driving module is in an unlocked state or a locked state;

a first driving device disposed in the housing and coupled to the fingerprint identification module, wherein the first driving device is capable of driving the engaging piece to engage with the engaging part when the displacement restricting part moves to the locked position and the electrical driving module is in a locked state, wherein the first driving device is capable of driving the engaging piece to release the engagement with the engaging part when the electrical driving module is in an unlocked state.

3. The opening and closing device according to claim 2, wherein:

an engaging piece force receiving part is disposed at the bottom of the engaging piece;

the first driving device includes a driving bump inserted into the engaging piece force receiving part, wherein the first driving device is capable of rotating to make the driving bump drive the engaging piece to move.

4. The opening and closing device according to claim 3, wherein the displacement restricting part is capable of moving along the direction parallel to a Z-axis, wherein the engaging piece is capable of moving along the direction parallel to an X-axis, wherein the first driving device is capable of rotating to make the driving bump rotate along a plane parallel to an X-Y plane, wherein the X-axis, a Y-axis, and the Z-axis are orthogonal.

5. The opening and closing device according to claim 4, wherein the engaging piece force receiving part is a groove extending along the direction parallel to the Y-axis.

* * * * *